(12) United States Patent
Philippen et al.

(10) Patent No.: US 10,290,130 B2
(45) Date of Patent: May 14, 2019

(54) VISUALIZATION OF CONNECTED DATA

(71) Applicant: International Business Machines Corporation, Armonk, NY (US)

(72) Inventors: Ruben P. Philippen, Weert (NL); Ramon L. H. Pisters, Weert (NL); Antonius G. P. Steijvers, Ell (NL); Jelle A. G. van den Elsen, Weert (NL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/252,616

(22) Filed: Aug. 31, 2016

(65) Prior Publication Data
US 2018/0061095 A1    Mar. 1, 2018

(51) Int. Cl.
| | | |
|---|---|---|
| *G06F 17/30* | (2006.01) | |
| *G06T 11/20* | (2006.01) | |
| *G06F 9/445* | (2018.01) | |
| *G06F 16/25* | (2019.01) | |

(52) U.S. Cl.
CPC ........ *G06T 11/206* (2013.01); *G06F 9/44526* (2013.01); *G06F 16/252* (2019.01)

(58) Field of Classification Search
CPC . G06T 11/206; G06T 1/0007; G06F 9/44526; G06F 17/30979; G06F 17/3056
See application file for complete search history.

(56) References Cited

U.S. PATENT DOCUMENTS

| | | | |
|---|---|---|---|
| 7,224,362 B2 | 5/2007 | Kincaid et al. | |
| 7,672,950 B2 | 3/2010 | Eckardt, III et al. | |
| 8,332,782 B1* | 12/2012 | Chang ................. | H04L 12/6418 707/794 |
| 8,949,233 B2 | 2/2015 | Hsiao et al. | |

(Continued)

FOREIGN PATENT DOCUMENTS

CN        105893604        *    8/2016

OTHER PUBLICATIONS

Wu et al., The Case for Data Visualization Management Systems [Vision Paper], Proceedings of the VLDB Endowment VLDB Endowment Homepage Archive, vol. 7, Issue 10, Jun. 2014, pp. 903-906.

(Continued)

*Primary Examiner* — Mark K Zimmerman
*Assistant Examiner* — Phuc N Doan
(74) *Attorney, Agent, or Firm* — Brian J. Colandreo, Esq.; Jeffrey T. Placker, Esq.; Holland & Knight LLP (57) ABSTRACT

A system and method for rendering data points contained in a set of generic data into a graphics object of a particular visualization type. The generic data is fetched by the system from a data store using data retrieval logic. Additional data bearing connection information about how to structure the generic data during rendering is fetched by one or more data retrieval plugins. The data retrieval plugins are selected from among a plurality of data retrieval plugins available to the system. The generic and additional data are rendered into a (Continued)

graphics object either jointly or sequentially. Through provision of these data retrieval plugins, it is thus possible to add visualization types that require additional data in a structured manner, or to add logic on how to connect fetched data points, without having to modify the system's own inbuilt data retrieval logic.

7 Claims, 5 Drawing Sheets

(56) References Cited

U.S. PATENT DOCUMENTS

| | | | |
|---|---|---|---|
| 2008/0180458 A1* | 7/2008 | Favart | G06F 9/455 |
| | | | 345/630 |
| 2008/0301120 A1 | 12/2008 | Zhu et al. | |
| 2010/0156889 A1* | 6/2010 | Martinez | G06F 17/30554 |
| | | | 345/418 |
| 2013/0191078 A1* | 7/2013 | Batra | G06F 17/5095 |
| | | | 703/1 |
| 2013/0191461 A1* | 7/2013 | Batra | G06F 17/50 |
| | | | 709/206 |
| 2013/0241926 A1* | 9/2013 | Asaria | G06Q 10/00 |
| | | | 345/419 |
| 2013/0297603 A1* | 11/2013 | Brenker | G06F 11/3006 |
| | | | 707/737 |
| 2013/0311463 A1* | 11/2013 | Werner | G06F 17/30604 |
| | | | 707/736 |
| 2014/0104310 A1* | 4/2014 | Kandogan | G09G 5/377 |
| | | | 345/629 |
| 2014/0149469 A1* | 5/2014 | Ghadge | G06F 17/30289 |
| | | | 707/805 |
| 2015/0242446 A1* | 8/2015 | Stolte | G06F 17/30592 |
| | | | 707/807 |
| 2015/0244579 A1* | 8/2015 | Birk | H04L 67/10 |
| | | | 709/223 |
| 2015/0278371 A1* | 10/2015 | Anand | G06F 17/3053 |
| | | | 707/723 |
| 2015/0378563 A1* | 12/2015 | Ramanathan | G06T 11/206 |
| | | | 715/781 |
| 2015/0378580 A1* | 12/2015 | Ramanathan | G06F 17/30554 |
| | | | 715/805 |
| 2016/0092336 A1* | 3/2016 | Atanasiu | G06F 11/323 |
| | | | 717/133 |
| 2016/0103585 A1* | 4/2016 | Varadharajan | G06Q 30/00 |
| | | | 715/810 |
| 2016/0104307 A1* | 4/2016 | Allyn | G06F 17/3012 |
| | | | 345/440 |
| 2017/0024494 A1* | 1/2017 | Batra | G06F 17/50 |
| 2017/0161926 A1* | 6/2017 | Shetty | G06Q 10/00 |

OTHER PUBLICATIONS

IBM Document, "Patent Applications to be Listed as Related," For Examiner's Eyes Only, pp. 1-2.

* cited by examiner

VISUALIZATION OF CONNECTED DATA

FIELD OF THE INVENTION

The present invention relates to rendering connected data points into a graphics object according to a desired visualization.

BACKGROUND

Visualizations are known data structures which contain suitable logic, which, when applied by a rendering application to render a data set of connected data points, create a graphics object, such as a chart, in a particular format. Such graphics objects are referred to in the art as network diagrams or node-link diagrams.

Examples of different data sets of connected data points suitable for visualization may include: an employee organisation chart; a computer or telecommunications network diagram; a chart of social network user relationships; and a protein interaction diagram. Once a visualization has been created, the rendered data points may then be displayed on a display screen. In a modern cognitive application, it may be desirable that the user at runtime is able to flexibly select what data to render and how to render it. That is to say, both the fetching at runtime as well as the determination of the rendering at runtime should both be flexible and work together seamlessly.

A rendering application for this purpose may include a data retrieval part which has suitable logic for fetching a data set to be rendered from a data source, such as a server, where it is stored. Moreover, a rendering application of this kind may render the retrieved data set according to the desired visualization, wherein visualizations may be classified by visualization type, e.g. according to the examples listed above.

When it is desired to add a new visualization type to the rendering application's list of supported visualization types, the data retrieval logic and the visualization logic may, in general, need to be updated. If a visualization type has very specific data requirements, the amount of change to the data retrieval logic can be significant. For example, adding a network diagram to a rendering application that is already configured to handle bar and line charts may require both the visualization and the data retrieval part to retrieve additional data in order to be able to correctly connect the data points (or nodes) contained in the retrieved data so as to create the desired graphics object. Moreover, some visualization types, such as network-oriented chart types, may need to access different data sources to fetch the additional data, e.g. a network diagram and an organisation chart may be stored in different data sources, so that the data retrieval logic may also need to be updated.

BRIEF SUMMARY OF THE INVENTION

According to a first aspect of the disclosure, there is provided a computer system for rendering data points contained in a set of generic data into a graphics object. The computer system may include an input/output unit for receiving requests to create a graphics object by rendering the generic data according to at least one visualization type among a plurality of possible visualization types. A plurality of data retrieval plugins may be included for fetching additional data bearing connection information about how to structure the generic data during rendering. A data retrieval unit may be included for fetching the generic data and the additional data from at least one data store, wherein, on receipt of a graphics object request. The data retrieval unit may be operable to fetch the generic data using inbuilt data retrieval logic of the data retrieval unit; select and load at least one of the data retrieval plugins; and fetch the additional data by running one or more of the loaded data retrieval plugins. The computing system may also include a visualization unit for rendering the data set fetched by the data retrieval unit into the requested graphics object. The visualization unit may be operable to receive the generic data and the additional data from the data retrieval unit; render the generic data and the additional data according to the at least one visualization type to create the requested graphics object; and pass the graphics object to the input/output unit for output in reply to the request.

The computer system may include a plurality of visualization plugins. The visualization unit may be operable to select and load at least one of the visualization plugins. The visualization unit may be operable to render, at least in part, by running one or more of the visualization plugins. In some implementations, at least a subset of the generic data and of the additional data may be rendered jointly by at least one of the selected and loaded visualization plugins to create the requested graphics object. In other implementations, the visualization unit may include inbuilt rendering logic, and at least a subset of the generic data may be rendered by the visualization unit's inbuilt rendering logic to create an interim graphics object and re-render the interim graphics object together with at least a subset of the additional data by at least one of the selected and loaded visualization plugins to create the requested graphics object. In certain embodiments, one or more of the visualization plugins selected and loaded may be selected according to a visualization type specified in, or deducible from, the graphics object request. Each visualization plugin may be specific to a single visualization type, but could relate to more than one visualization type.

In certain embodiments, one or more of the data retrieval plugins that are selected and loaded may be selected according to a visualization type specified in, or deducible from, the graphics object request.

In some embodiments, each of the data retrieval plugins, or at least a subset of them, may be specific to a particular visualization type. In some implementations, the computer system may be able to fetch the connection information about those data points defined in the request, e.g. chosen by the end user who formulated the request, and the connection information contained in the additional data may be used by any visualization type that can render data points with this connection information. An application running on the computer system may, therefore, be able to allow users to select any generic data for visualization and have the computer system automatically render the data points contained in the generic data in a connected way.

The computer system may further include a stored list of supported visualization types, each may include an annotation specifying the additional data that is associated with that visualization type. One or more of the data retrieval plugins may be selected based on at least one of: the annotation for the visualization type specified in the graphics object request; and the content of the generic data.

In certain embodiments, the additional data may also contain other information specific to the visualization type and how it may be rendered. A visualization type may render data points connected or not connected, depending, in some embodiments, on whether the additional information could be retrieved or not. In an example, for an org (i.e. organization) chart, if no connection information can be found then all employees may be rendered next to each other in a long horizontal list. On the other hand, if the connection information is available, then those same employees may be rendered hierarchically based on their connection information.

In some implementations, it may be efficient for the data retrieval plugin to select which additional data to fetch based on the generic data already fetched by the inbuilt data retrieval logic. In that way, with knowledge of what generic data has actually been fetched, only the additional data needed for co-rendering the actually fetched generic data may be requested from the data store. The additional information for connecting data points may come from a different data source than the information for the data points themselves. For example, employee information might come from a sales table, while the connection information might come for an employee directory.

According to another implementation, there is provided a method for rendering data points contained in a set of generic data into a graphics object. The method may include receiving a request to create a graphics object by rendering the generic data according to at least one visualization type among a plurality of possible visualization types. The method may also include providing a plurality of data retrieval plugins for fetching additional data bearing connection information about how to structure the generic data during rendering. The method may also include fetching the generic data and the additional data from at least one data store by fetching the generic data using inbuilt data retrieval logic; selecting and loading at least one of the data retrieval plugins; and fetching the additional data by running one or more of the loaded data retrieval plugins. The method may also include rendering the fetched data set into the requested graphics object by receiving the generic data and the additional data that has been fetched; rendering the generic data and the additional data according to the at least one visualization type to create the requested graphics object; and outputting the graphics object in reply to the request.

According to yet another implementation, there is provided a computer program stored on a non-transitory computer readable medium and loadable into memory of a computer system, which, when executed on the computer system, performs operations including rendering data points contained in a set of generic data into a graphics object. Instructions may be included for receiving a request to create a graphics object by rendering the generic data according to at least one visualization type among a plurality of possible visualization types. Instructions may also be included for providing a plurality of data retrieval plugins for fetching additional data bearing connection information about how to structure the generic data during rendering. Instructions may also be included for fetching the generic data and the additional data from at least one data store by fetching the generic data using inbuilt data retrieval logic; selecting and loading at least one of the data retrieval plugins; and fetching the additional data by running one or more of the loaded data retrieval plugins. Instructions may further be included for rendering the fetched data set into the requested graphics object by receiving the generic data and the additional data that has been fetched; rendering the generic data and the additional data according to the at least one visualization type to create the requested graphics object; and outputting the graphics object in reply to the request.

According to still another implementation, there is provided a computer program product storing a computer program which, when executed on the computer system, performs operations including rendering data points contained in a set of generic data into a graphics object. The computer program may also perform operation including receiving a request to create a graphics object by rendering the generic data according to at least one visualization type among a plurality of possible visualization types. The computer program may also perform operations including providing a plurality of data retrieval plugins for fetching additional data bearing connection information about how to structure the generic data during rendering. The computer program may also perform operations including fetching the generic data and the additional data from at least one data store by fetching the generic data using inbuilt data retrieval logic; selecting and loading at least one of the data retrieval plugins; and fetching the additional data by running one or more of the loaded data retrieval plugins. The computer program may further perform operations including rendering the fetched data set into the requested graphics object by receiving the generic data and the additional data that has been fetched; rendering the generic data and the additional data according to the at least one visualization type to create the requested graphics object; and outputting the graphics object in reply to the request.

The system and method may provide a design framework which may allow the additional data needed for any particular visualization to be fetched in the same way for all visualization types, such as for organization charts or network diagrams. The list of currently supported visualization types stored in the computer system may be annotated to indicate the need for such additional data. The system may be able to fetch the additional data by finding a data retrieval plugin that satisfies the request from the visualization. Once the data retrieval plugin has fetched this additional data, the system may pass this additional data to the visualization unit without having to process this additional data itself, this task being delegated to the data retrieval plugin loaded for this purpose. The visualization unit may render the fetched data to create the requested graphics object.

The system and method may exhibit improved performance when visualization types are already represented in an abstract way. By abstract, it may be meant that each implementation of a visualization type may have an identical interface that may be used by the system. As such, to the system, each of the visualization types may behave in exactly the same generic fashion. Accordingly, system may generically load visualization types, without having to differently treat each type with dedicated code options. Abstract visualization types may also make it easier for the system to find the rendering-relevant annotations in the visualization and pass back the additional data that has been requested by the data retrieval plugin in a generic manner. However, it may not be necessary that the visualizations are represented in an abstract way. For example, the visualizations may be represented in a way that the system may find and analyze the annotations and pass the additional data to the visualization unit.

BRIEF DESCRIPTION OF THE DRAWINGS

In the following description, features of the present disclosure will further be described by way of example only with reference to exemplary embodiments illustrated in the figures.

DETAILED DESCRIPTION OF EXAMPLE EMBODIMENTS

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

Figure 1:
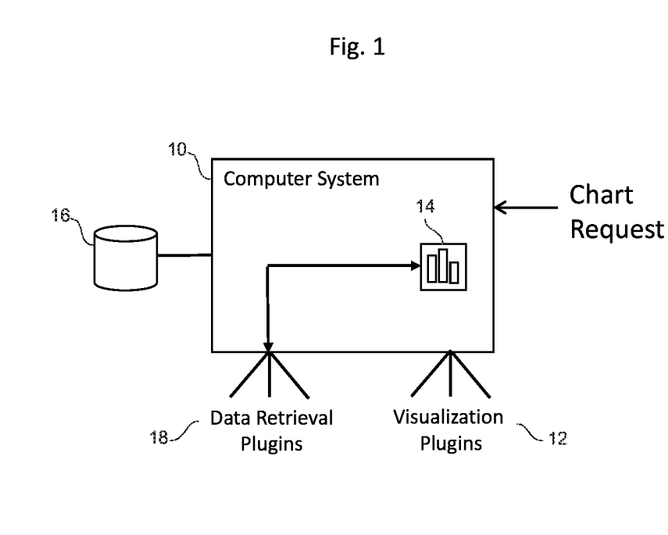
FIG. 1 is a schematic representation of a system showing the principles of the present disclosure, according to an example embodiment.

FIG. 1 is a schematic representation of a system 10 showing example principles of the disclosure. The system 10 hosts a rendering application operable to render a data set of data points, all or some of which may be connected to each other by the rendering, and thereby may create a graphics object 14, such as a chart. The rendered data points (i.e. nodes) may then be output and displayed on a display screen. The rendering application may render the retrieved data using visualization logic. The data retrieval part of the rendering application may maintain a list of the currently supported visualization types. The data retrieval part may include data retrieval logic for performing the data retrieval. The data retrieval logic may or may not need to know the data structure of each visualization type. If the data structure for populating the visualizations is generic, then it may not be necessary to know the data structure, whereas if the data structure is different from different visualization types, then the list may include the data structure associated with each visualization type. This list can be made available to a user to choose from. The chosen type may then be loaded and used to render any results. The list may be the means by which the system "knows" what possibilities are in principle available and thus what to load and make available during a specific session or when processing a specific user request.

In addition, the system itself may choose the visualization type, or provide visualization type suggestions to a user, based on the list, i.e. based on what is available. The rendering application may use any one of 'M' different visualization plugins 12 for 'M' different visualization types. The rendering application may have available to it, and may be able to load and run, any one of 'M' available visualization plugins $12_1, 12_2, \ldots 12_m \ldots 12_M$, each of which may be specific to a visualization type or generic to all or some visualization types. The rendering application may load and run a selected one of the visualization plugins $12_m$ to render a data set of data points into a graphics object 14. The rendering of the data set may be done specific to the visualization type or types associated with the data and/or the graphics object request. The data set may be fetched from a data source 16, which may be a server. The data set may include generic data of the points to be connected and additional data bearing connection information about how to structure the generic data during rendering. By way of clarification, the term 'data set' may relate to the data that has been fetched, i.e. the generic data and the additional data, and is not intended to imply that the generic data and the additional data were part of a common data set prior to being fetched for visualization. Generally, the generic data and the additional data may be stored separately, although in some cases they might be stored together. Different data sources may hold different data, and from this the choice of visualization type may differ. Moreover, a single rendering may involve multiple data sets, which may be fetched separately from a common or separate data sources.

The rendering application, when it requests additional data to be fetched from a data store 16, may make the request together with a representation of the structure it expects. The representation may be provided by a data retrieval plugin. Namely, the rendering application also has available to it, and is able to load and run, any one of 'M' data retrieval plugins $18_1, 18_2, \ldots 18_m \ldots 18_M$, each of which may be specific to a visualization type or generic to all or some visualization types. The provision of the data retrieval plugins $18_m$ together with the visualization plugins $12_m$ may make it possible for the rendering application to add functionality to handle new visualization types without having to modify the system's data retrieval logic or visualization logic. Rather, if necessary, the rendering application may add a visualization plugin and a data retrieval plugin in order to handle the new visualization type. Adding a data retrieval plugin may not be necessary, for example it may be possible that a plugin that can handle the visualization type (and its annotation) is already available to the system. Each specific visualization type thus typically has an associated data retrieval plugin (or multiple plugins), which may combine in a pairwise (or one-to-many) fashion to enable retrieval and rendering respectively of each specific visualization type.

Figure 2:
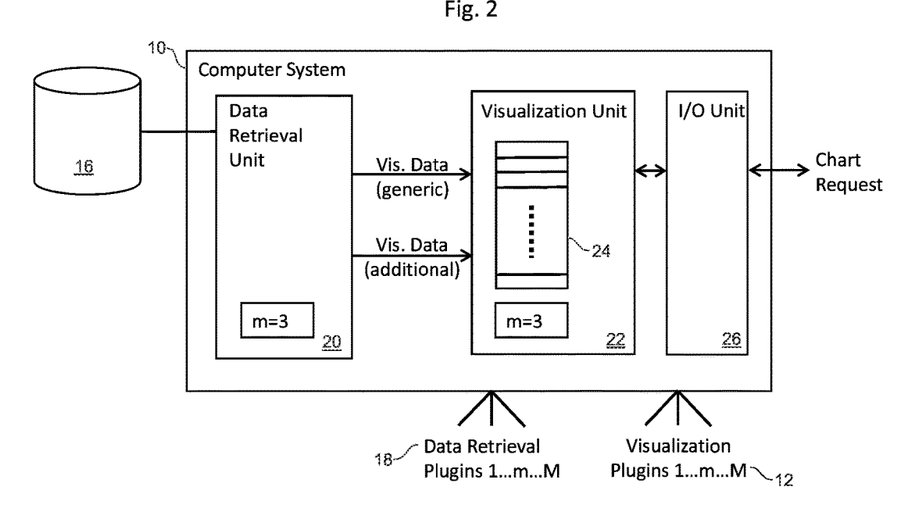
FIG. 2 is a schematic representation of a system embodying the present disclosure, according to an example embodiment.

FIG. 2 is a schematic representation of a computer system for rendering a data set of data points into a graphics object according to the principles described above in relation to FIG. 1. The system 10, visualization plugins 12, data source 16, and data retrieval plugins 18 already described in relation to FIG. 1 are shown.

The computer system 10 may have an input/output (I/O) unit 26 for receiving requests to create a graphics object, such as a chart. The requests may specify a particular visualization type, among a plurality of possible visualization types, which the computer system 10 is able to create. The requests may also specify the data which is to be rendered, i.e. the generic data which will be depicted in the graphics object. The computer system 10 may also have a data retrieval unit 20 which may be responsible for fetching the requested data from one or more data stores 16, with one being shown in FIG. 2. The data retrieval unit 20 may include inbuilt data retrieval logic for retrieving the generic data. The computer system 10 may further include a visualization unit 22 which may be responsible for rendering the data fetched by the data retrieval unit 20 into the requested graphics object. The visualization unit 22 may include inbuilt visualization logic for rendering the generic data.

In use, on receipt of a graphics object request by the I/O unit 26, the data retrieval unit 20 may be operable to fetch generic data contained in one or more data sets using its inbuilt data retrieval logic. As well as generic data, the visualization may require additional data. Like the generic data, the additional data may also comprise one or more (additional) data sets which may be fetched from a common or separate data sources. The additional data may typically include connection information (i.e. data) which specifies how to structure the generic data for rendering, e.g. according to the requested visualization type. To obtain this additional data, the computer system 10 may select, load and run a suitable data retrieval plugin 18. By way of example, one such data retrieval plugin m=3 is shown in FIG. 2 as being currently loaded in the data retrieval unit 20. An efficient mode of operation may be when the data retrieval plugin 18 selects which additional data to fetch based on the generic data. In other words, the data retrieval unit 20 may load the generic data first, so that the data retrieval plugin 18 can analyse the generic data to establish exactly what additional data is required.

Now in possession of both the generic data and the additional data, these may be passed from the data retrieval unit 20 to the visualization unit 22 for rendering into the requested graphics object according to the current visualization type. The graphics object may then be passed from the visualization unit 22 to the I/O unit 26 for output to complete the request. The graphics object may be suitable for display on a display screen, and may be displayed by the entity that made the request, or may be displayed by the computer system 10, if the computer system 10 is provided with a suitable display screen and display driver.

The visualization unit 22 may have available to it a plurality of visualization plugins 12, each specific to a visualization type 'm'. To create the requested graphics object, the visualization unit may be operable to select and load the visualization plugin specific to the current visualization type and then render by running the visualization plugin. By way of example, one such visualization plugin m=3 is shown in FIG. 2 as being currently loaded in the visualization unit 22. The visualization plugin 12 may only perform part of the overall rendering, or may be entirely responsible for the rendering, i.e. render both the generic data and the additional data. One alternative may be that the visualization plugin 12 works in cooperation with inbuilt visualization logic possessed by the visualization unit that is capable of rendering the generic data. Namely, in this alternative, the visualization unit may have inbuilt rendering logic, and the generic data may be rendered by the visualization unit's inbuilt rendering logic to create an interim graphics object, and then the interim graphics object may be re-rendered together with the additional data by the visualization plugin to create the requested graphics object. On the other hand, in another alternative, the generic data and the additional data may be rendered jointly by the visualization plugin to create the requested graphics object, i.e. all the rendering may be done by the visualization plugin.

In some embodiments, the computer system 10 may further include a stored list 24 of supported visualization types, each including an annotation specifying the additional data which may specify how to structure the generic data for rendering according to the requested visualization type. This stored list 24 may conveniently be hosted by the visualization unit 22, but its location within the computer system 10 is flexible. A role of this list may be to assist in selection of the appropriate data retrieval plugin 18 for satisfying a graphics object request, wherein the data retrieval plugin 18 may be selected based on the annotation for the visualization type specified in the graphics object request.

In this way, it may be possible to add visualization types that require additional data without having to modify the system's data retrieval logic. Rather, adding a visualization type may be effected by checking that any suitable visualization plugin(s) 12 and/or a data retrieval plugin(s) 18 are available to the system. With this approach, the rendering application, or more generally the computer system, may not need to know the data source location(s) of the additional data required for the requested visualization, since the data retrieval plugin 18 may be responsible for retrieving this additional data.

The same approach may also be used to add logic on how to connect fetched generic data. That is, a plugin may fetch additional data to provide logic on how to connect data, as well as or instead of fetching additional data relating to how the generic data is to be represented visually. A specific example is as follows. Suppose a company has an org-chart for its staff that is annotated with "employee, manager" (i.e. the generic data) and there is a plugin for finding the "employee, manager" connection data (i.e. the additional data) for the employee data from an employee directory. Suppose further that the company now acquires a new company which has its own, differently configured employee directory and it is desired to merge in the new company's employee directory into the old company's employee directory. This task may be solved by providing a new data retrieval plugin to enable the new directory to be merged into the old directory. The new plugin may provide a different set of logic for translating how the data points of the old directory are connected into how the data points of the new directory are connected. It will be understood from this example that the role of the new plugin may be unrelated to visualization, since the existing visualization type is still useable, rather the new plugin may be related solely to data retrieval so as to merge one directory into another.

Figure 3:
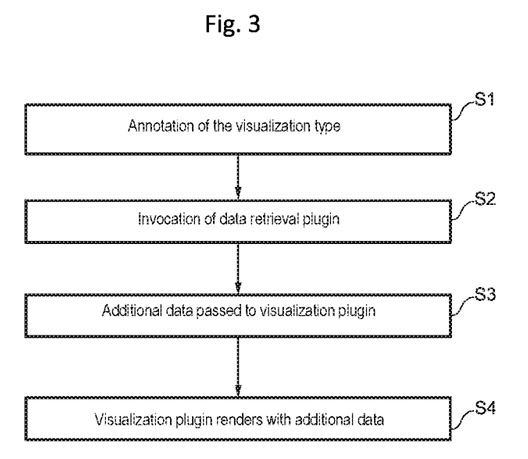
FIG. 3 is a flow chart showing steps of a method embodying the present disclosure, according to an example embodiment.

FIG. 3 is a flow chart showing steps of an example implementation of a method which can be carried out in the system of FIG. 2. As described above, the method may allow new visualization types which require additional data to be added to a computer system for rendering a data set of data points into a graphics object without having to alter generic parts of the system.

S1 may include annotation of the visualization. A new visualization type may be added to the list of existing visualizations. The new visualization type may be annotated to indicate what additional data about the structure of the generic data is needed. The additional data may have a standard format and may describe the structure and other additional information about the additional data.

S2 may include an invocation of data retrieval plugin. When the rendering application has read the annotation associated with the new visualization type, it may look for a data retrieval plugin suitable for the new visualization type. The data retrieval plugins may have a format which makes available information in an interface portion in order to allow an external agent, such as the rendering application, to assess what visualization type or types each data retrieval plugin may be applicable to. A data retrieval plugin may also be configured to instruct the data retrieval unit to send it the generic data, which can be combined with the additional data directly retrieved by the data retrieval plugin. The resulting additional data may be transmitted to the visualization unit in a predefined format that the visualization plugin can understand.

S3 includes additional information passed back to visualization. Now that the system has fetched the additional data through the data retrieval plugin, all the system may need to do is pass the additional data to the visualization unit. It should be noted that the generic parts of the system may not need to process the additional data, but may only need to pass the additional data to the visualization plugin for processing. It should also be noted that the system may handle the request for the generic data and the additional data together (i.e. jointly), or separately (i.e. independently or asynchronously). Specifically, in some implementations, as described further above, the data retrieval plugin may be configured to receive the generic data and analyze it before fetching the additional data, whereas, in other implementations, the data retrieval plugin may fetch the additional data based solely on the information contained in the original request, without having regard to the actual generic data which is fetched.

S4 includes a visualization plugin renders with additional data. Once the system has passed the additional data to the visualization unit, the visualization unit may now render by making use of this additional data. This may mean that the visualization unit uses its own visualization logic to render the generic data and then the visualization plugin re-renders the already-rendered generic data using the additional data, or that the visualization plugin performs joint rendering of the additional data and the generic data. This choice may be visualization and implementation dependent. The graphics object may now show the desired visual outcome, having combined both the generic data and the additional data.

In this example method, the system did not need to know about how the additional data is rendered, or how it needed to be fetched. The system thus may allow visualization types to be added in a structured way with the use of standard-format data retrieval plugins for fetching the additional data, e.g. one for a company employee directory, for that part of the rendering which is specific to the additional data, therefore avoiding the need for an unstructured reprogramming of the whole system to adapt to different visualization types.

Moreover, it is noted that although the general aim of the rendering may be to determine how to connect the data points, it may be that the visualization application may be partially unsuccessful in determining how to connect all the data points. If the visualization application is unable to determine how to connect some of the data points, then the visualization application may be programmed to render those data points in a non-connected way.

Figure 4:
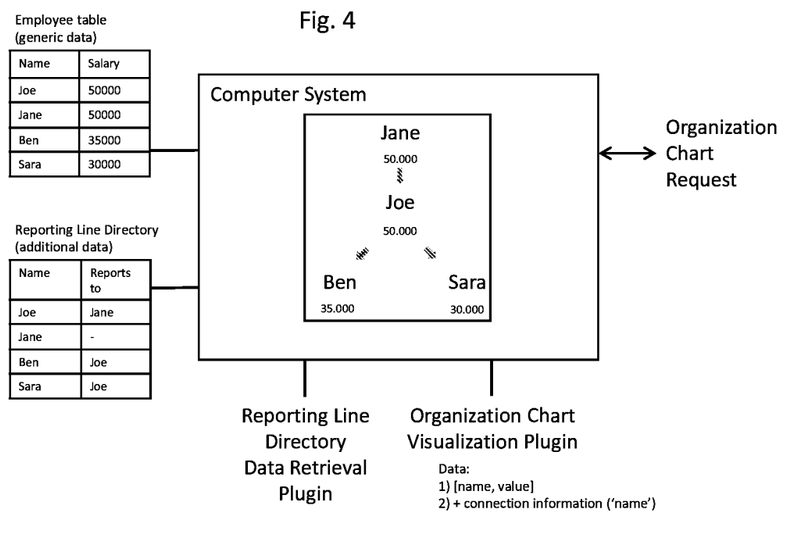
FIG. 4 is a schematic representation of a system embodying the present disclosure satisfying a specific visualization request, according to an example embodiment.

FIG. 4 is a schematic representation of a system embodying the disclosure satisfying a specific visualization request for an organization chart. It is assumed in this example that there is an 'organization chart' visualization type which may not be previously known to the system, i.e. not already held in the list of currently supported visualization types. The example starts by creating a new 'organization chart' visualization type that adds annotation to require connection data (i.e. additional data) in the form ["from", "to"] data. Here it is noted that the ["name", "value"] data may be part of the generic data. To handle the connection data request, a 'reporting line directory' data retrieval plugin may be looked for and then loaded, which may be operable to fetch the additional data for this new visualization type from an organization directory. To create the requested chart having the new 'organization chart' visualization type, the system may start by retrieving the generic data (Employee Table). The data retrieval plugin may inspect the generic data (Employee Table) and may be prompted to retrieve the connection data (Reporting Line Directory). It may find the 'reporting line directory' data retrieval plugin and then load it. The data retrieval plugin may be executed, i.e. run, to fetch the connection data. Once the additional data has been retrieved (the data that is related to the reporting line directory), it may be rendered together with the generic data into an organization chart, in which it can be seen in FIG. 4 that the additional data (i.e. the reporting lines) are fused together with the generic data (i.e. employee names and salaries) into a unified graphical representation.

Figure 5:
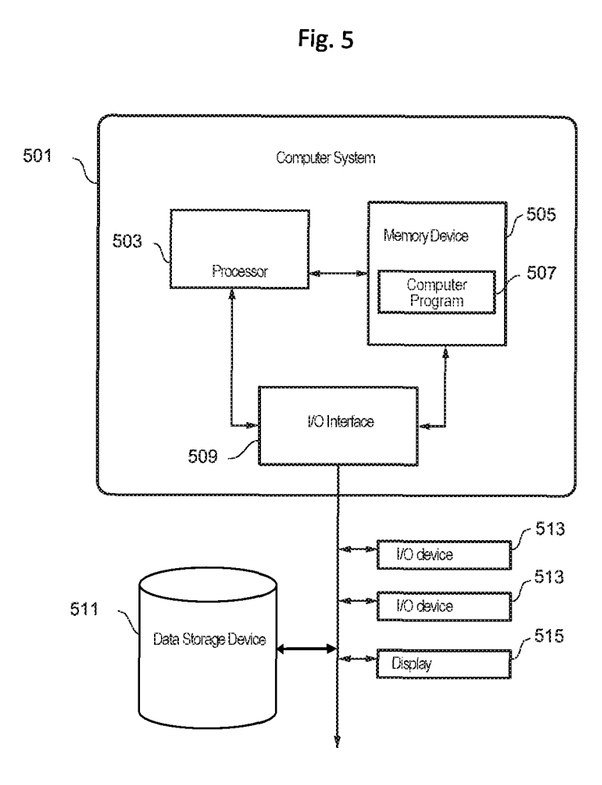
FIG. 5 show a generic computer capable of hosting systems embodying the disclosure, according to an example embodiment.

FIG. 5 shows a structure of a computer system 501 and computer program 507 that may be used to implement the above-described methods embodying the present disclosure. The computer system 501 may include a processor 503 coupled through one or more I/O Interfaces 509 to one or more hardware data storage devices 511 and one or more I/O devices 513, which can manage graphic object requests, and a display 515 on which the graphics objects can be displayed. The processor 503 may also be connected to one or more memory devices 505. At least one memory device 505 contains stored computer program 507, which is a computer program that includes computer-executable instructions. The stored computer program 507 may include a program that implements a method for the efficient selection of runtime rules for programmable search in accordance with the present example. The data storage devices 511 may store the computer program 507. The computer program 507 stored in the storage devices 511 is configured to be executed by processor 503 via the memory devices 505. The processor 503 executes the stored computer program 507.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service including steps of deploying computer program operable to, when deployed into a computer infrastructure and executed thereon, cause the computer system to perform all the steps of the method.

It will be appreciated that the method and components of the example embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Consistent with the foregoing, there has been described a system and method for rendering data points contained in a set of generic data into a graphics object of a particular visualization type. The generic data may be fetched by the system from a data store using the system's own inbuilt data retrieval logic, whereas additional data bearing connection information about how to structure the generic data during rendering may be fetched by one or more data retrieval plugins. The data retrieval plugins used to fetch the data when servicing a particular request may be selected from among a plurality of data retrieval plugins available to the system. The generic and additional data may be rendered into a graphics object either jointly or in a sequentially. Through provision of these data retrieval plugins. In this way, it may be thus possible to add visualization types that require additional data in a structured manner, or to add logic on how to connect fetched data points, without having to modify the system's own inbuilt data retrieval logic.

It will be clear to one skilled in the art that many improvements and modifications can be made to the foregoing exemplary embodiment without departing from the scope of the present invention.

What is claimed is:

1. A computer system comprising:
an input/output unit configured to receive a request to create a graphics object by rendering a set of generic data according to at least two or more visualization types among a plurality of possible visualization types;
a plurality of data retrieval plugins configured to fetch additional data bearing connection information about how to structure the generic data during rendering without having to alter the generic data relative to the computer system, wherein the at least two or more visualization types are configured to render a plurality of data points that are at least one of connected and non-connected, wherein the plurality of connected data points is rendered hierarchically, and wherein the plurality of non-connected data points is rendered in a horizontal list;
a data retrieval unit configured to fetch the generic data and the additional data from at least one data store, wherein, on receipt of a graphics object request, the data retrieval unit is configured to:
fetch the generic data using inbuilt data retrieval logic of the data retrieval unit;
select and load at least one of the data retrieval plugins; and
fetch the additional data by running one or more of the loaded data retrieval plugins that satisfy the request from each of the at least two or more visualization types, wherein the additional data includes connection information about how to structure the generic data; and
render, via a visualization unit, the data set fetched by the data retrieval unit into the requested graphics object, wherein the visualization unit is configured to:
receive the generic data and the additional data from the data retrieval unit;
render the generic data, using a visualization logic relative to the visualization unit, and the additional data according to the at least two or more visualization types to create the requested graphics object, wherein the rendered additional data is passed to the visualization unit, via at least one visualization plugin of a plurality of visualization plugins, without having to further process the additional data, wherein the visualization unit is operable to:
select and load at least one visualization plugin; and
render, at least in part, by running the at least one visualization plugin, wherein at least a subset of the generic data and the additional data are rendered jointly by at least one of the selected and loaded visualization plugins to create the requested graphics object; and
pass the graphics object to the input/output unit, wherein the graphics object is output, via the input/output unit, in reply to the request; and
a stored list of supported visualization types, each of the supported visualization types comprising an annotation specifying the additional data that is associated with that visualization type.

2. The computer system of claim 1, wherein the visualization unit has inbuilt rendering logic, and wherein at least a subset of the generic data is rendered by the visualization unit's inbuilt rendering logic to create an interim graphics object and re-render the interim graphics object together with at least a subset of the additional data by at least one of the selected and loaded visualization plugins to create the requested graphics object.

3. The computer system of claim 1, wherein, for at least a subset of the visualization plugins, each is specific to a visualization type of the two or more visualization types.

4. The computer system of claim 1, wherein one or more of the data retrieval plugins are selected based on at least one of: the annotation for the visualization type specified in the graphics object request; and the content of the generic data.

5. The computer system of claim 1, wherein one or more of the data retrieval plugins are configured to select which additional data to fetch based on the generic data already fetched by the inbuilt data retrieval logic.

6. A computer program stored on a non-transitory computer readable medium and loadable into memory of a computer system, which, when executed on the computer system, performs operations, via a processor, comprising:
receiving, via the processor, a request to create a graphics object by rendering a set of generic data according to at least two or more visualization types among a plurality of possible visualization types;
providing, via the processor, a plurality of data retrieval plugins configured to fetch additional data bearing connection information about how to structure the generic data during rendering without having to alter the generic data relative to the computer system, wherein the at least two or more visualization types are configured to render a plurality of data points that are at least one of connected and non-connected, wherein the plurality of connected data points is rendered hierarchically, and wherein the plurality of non-connected data points is rendered in a horizontal list;
fetching, via the processor, the generic data and the additional data from at least one data store by:
fetching the generic data using inbuilt data retrieval logic; selecting and loading at least one of the data retrieval plugins; and
fetching the additional data by running one or more of the loaded data retrieval plugins that satisfy the request from each of the at least two or more visualization types, wherein the additional data includes connection information about how to structure the generic data; and
rendering, via a visualization unit, the fetched data set into the requested graphics object by:
receiving the generic data and the additional data that has been fetched;
rendering the generic data, using a visualization logic relative to the visualization unit, and the additional data according to the at least two or more visualization types to create the requested graphics object, wherein the rendered additional data is passed to the visualization unit, via at least one visualization plugin of a plurality of visualization plugins, without having to further process the additional data, wherein the visualization unit is operable to:
select and load the at least one visualization plugin; and
render, at least in part, by running the at least one visualization plugin, wherein at least a subset of the generic data and of the additional data are rendered jointly by at least one of the selected and loaded visualization plugins to create the requested graphics object; and
outputting the graphics object, via the input/output unit, in reply to the request; and storing a list of supported visualization types, each of the supported visualization types comprising an annotation specifying the additional data that is associated with that visualization type.

7. A non-transitory computer program product storing a computer program which, when executed on a computer system, performs operations, via a processor, comprising:
receiving, via the processor, a request to create a graphics object by rendering a set of generic data according to at least two or more visualization types among a plurality of possible visualization types;
providing, via the processor, a plurality of data retrieval plugins configured to fetch additional data bearing connection information about how to structure the generic data during rendering without having to alter the generic data relative to the computer system, wherein the at least two or more visualization types are configured to render a plurality of data points that are at least one of connected and non-connected, wherein the plurality of connected data points is rendered hierarchically, and wherein the plurality of non-connected data points is rendered in a horizontal list;
fetching, via the processor, the generic data and the additional data from at least one data store by:
fetching the generic data using inbuilt data retrieval logic;
selecting and loading at least one of the data retrieval plugins; and
fetching the additional data by running one or more of the loaded data retrieval plugins that satisfy the request from each of the at least two or more visualization types, wherein the additional data includes connection information about how to structure the generic data; and
rendering, via a visualization unit, the fetched data set into the requested graphics object by:
receiving the generic data and the additional data that has been fetched;
rendering the generic data, using a visualization logic relative to the visualization unit, and the additional data according to the at least two or more visualization types to create the requested graphics object, wherein the rendered additional data is passed to the visualization unit, via at least one visualization plugin of a plurality of visualization plugins, without having to further process the additional data, wherein the visualization unit is operable to:
select and load the at least one visualization plugin; and
render, at least in part, by running the at least one visualization plugin, wherein at least a subset of the generic data and of the additional data are rendered jointly by at least one of the selected and loaded visualization plugins to create the requested graphics object; and
outputting the graphics object, via the input/output unit, in reply to the request; and
storing a list of supported visualization types, each of the supported visualization types comprising an annotation specifying the additional data that is associated with that visualization type.

* * * * *